Feb. 18, 1941.  E. A. PRATT  2,232,404
AUTOMATICALLY CONTROLLED MIXING PLANT
Original Filed March 31, 1934   6 Sheets-Sheet 1
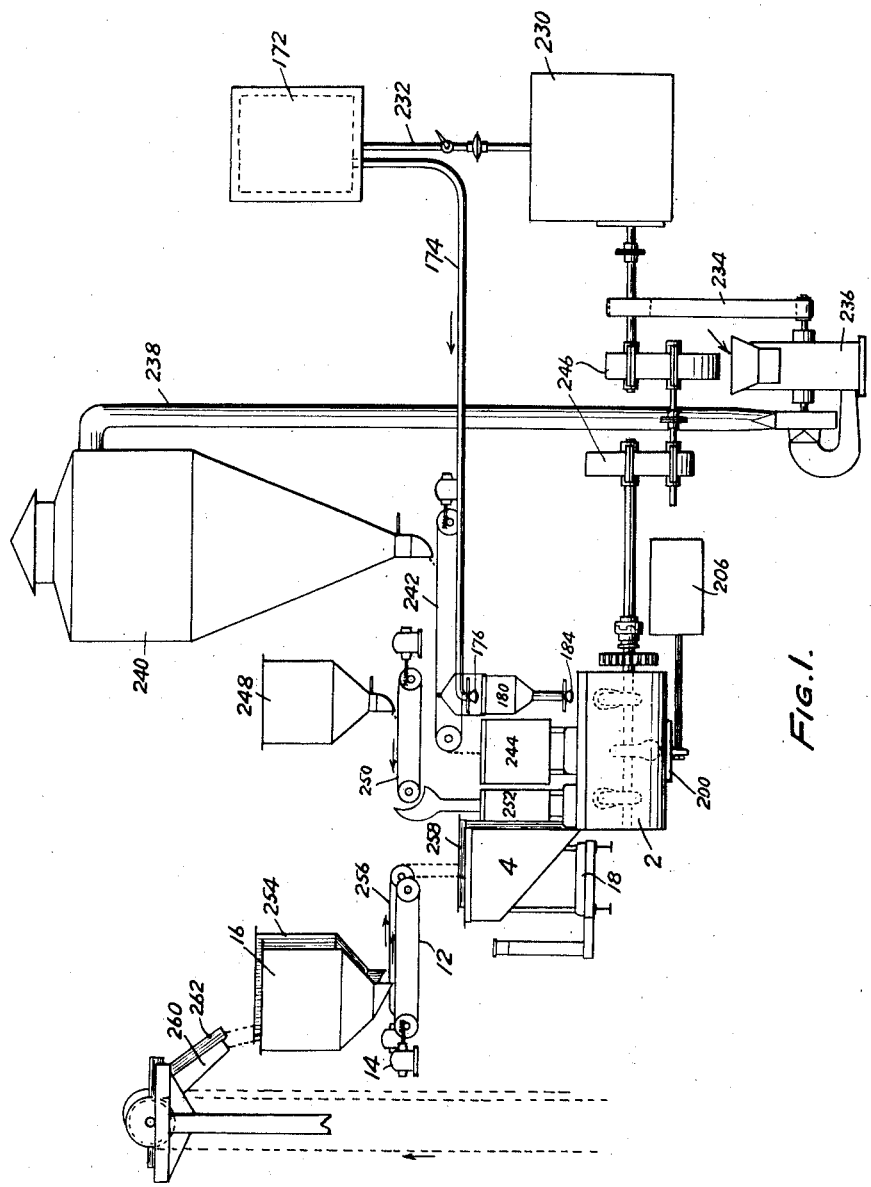
WITNESS:
INVENTOR
Edmund A. Pratt
BY
ATTORNEYS.

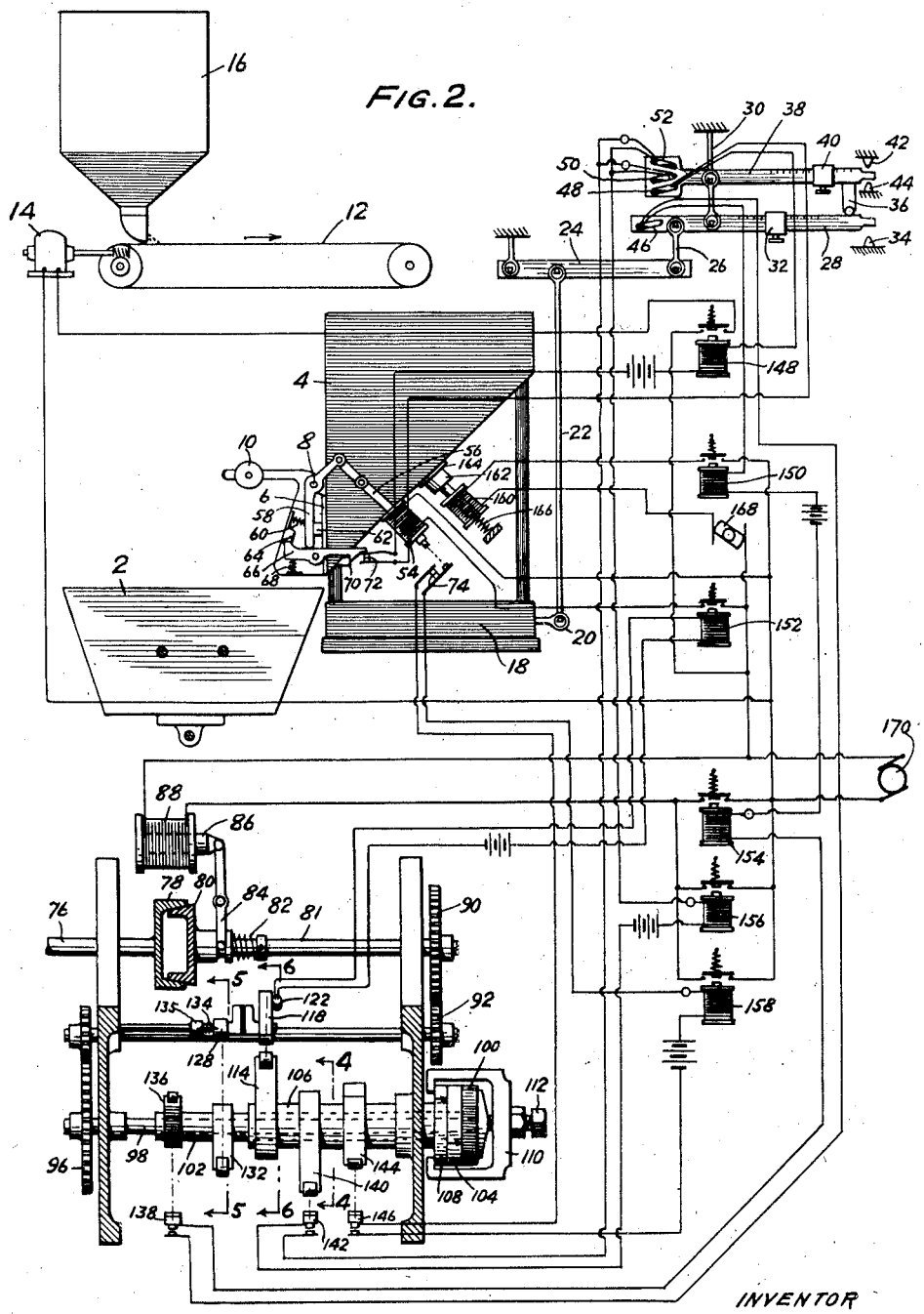

Feb. 18, 1941.   E. A. PRATT   2,232,404

AUTOMATICALLY CONTROLLED MIXING PLANT

Original Filed March 31, 1934   6 Sheets-Sheet 3

WITNESS:
Robt P Mitchel

INVENTOR
Edmund A. Pratt
BY
Busser & Harding
ATTORNEYS.

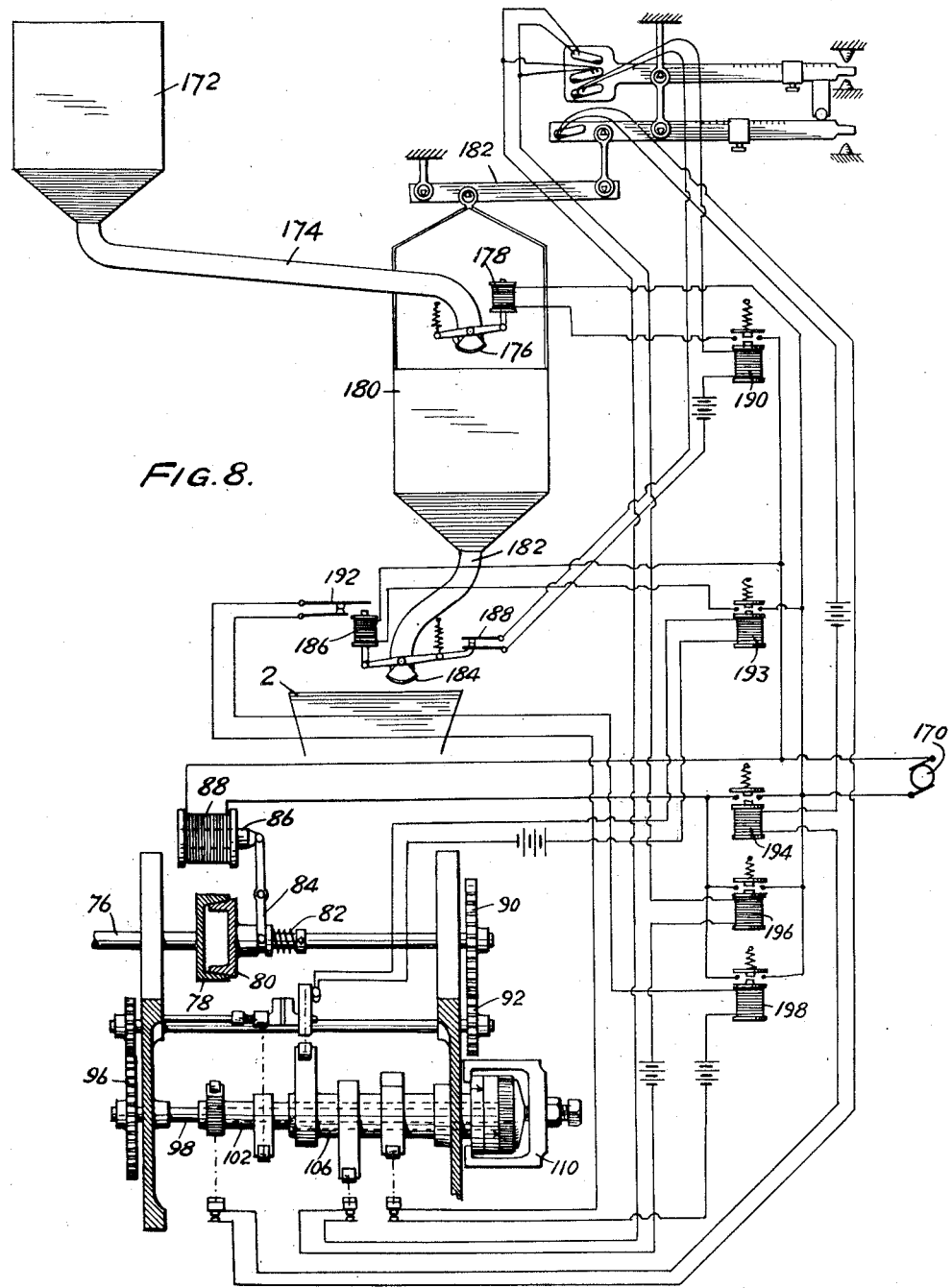

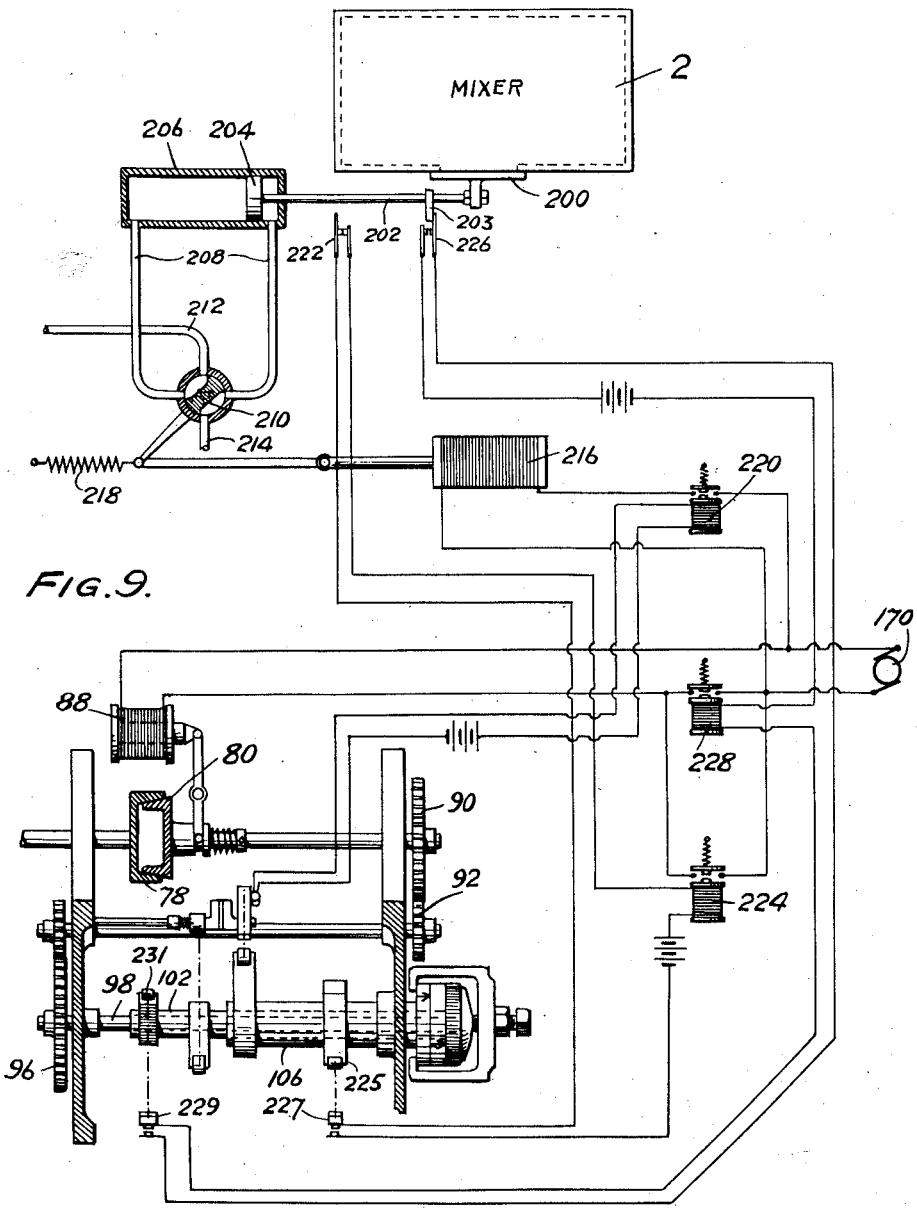

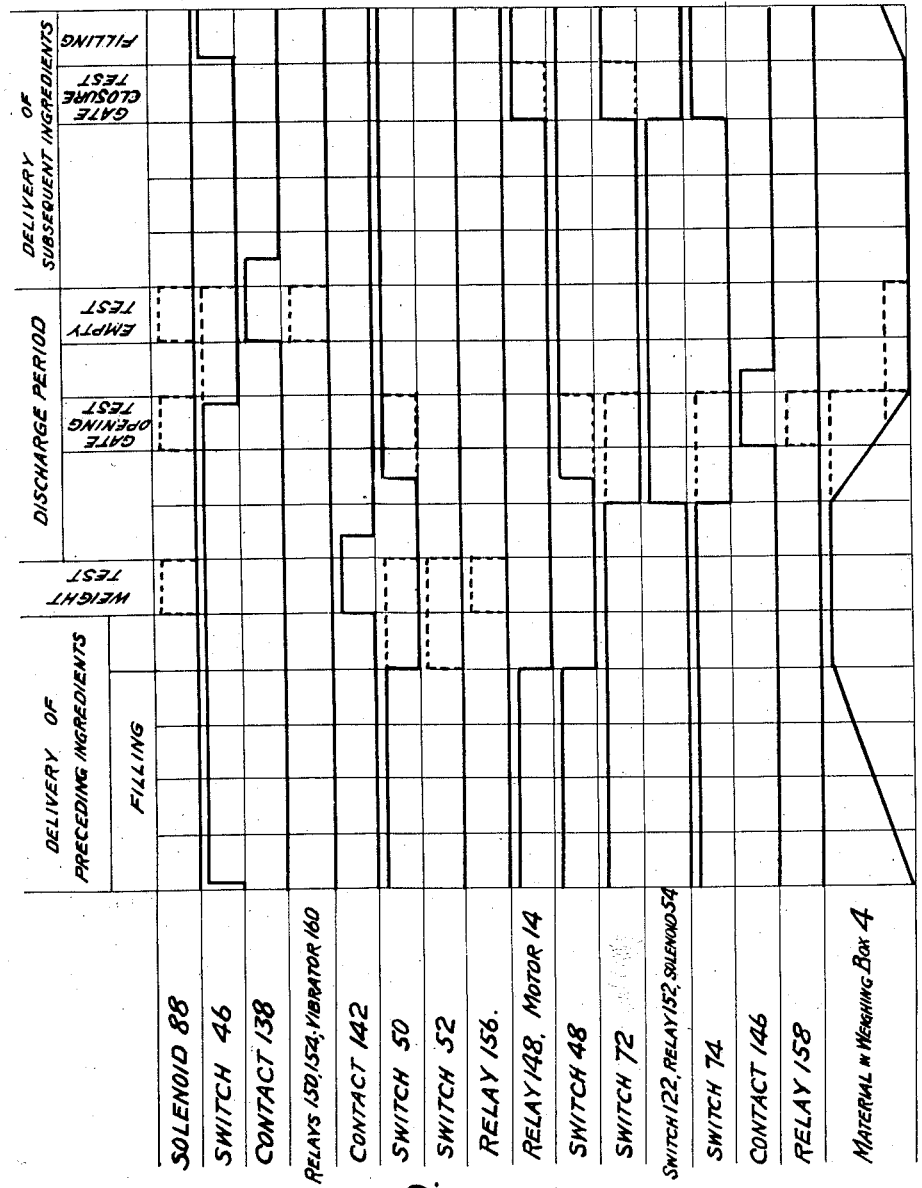

Patented Feb. 18, 1941

2,232,404

UNITED STATES PATENT OFFICE 2,232,404

AUTOMATICALLY CONTROLLED MIXING PLANT

Edmund A. Pratt, Devon, Pa., assignor to Barber Asphalt Corporation, Barber, N. J., a corporation of New Jersey Continuation of application Serial No. 718,522, March 31, 1934. This application July 13, 1938, Serial No. 219,086

17 Claims. (Cl. 249—22)

This invention relates to a mixing plant or other processing plant which requires that ingredients be fed in predetermined proportions and which is automatically controlled either totally or partially and is particularly adapted for the preparation of paving mixtures.

This application is a continuation of my application Serial No. 718,522, filed March 31, 1934.

In the preparation of mixtures having more than two or three ingredients which must be added in well defined quantities, it is difficult to provide proper manual control in such fashion as to prepare a batch in a comparatively short period, since so many matters need be taken into account and proper sequential addition of ingredients to a mixer or other processing equipment insured. This is particularly true if a number of operators are controlling the ingredients and something occurs in the addition of any one of them. Too much or too little of an ingredient may be added, or the addition may not occur at the proper times with the result that spoiling of batches may possibly occur.

The broad object of the present invention is to provide means for automatically controlling the proportioning of the ingredients of the mixture, the introduction of ingredients into a mixer or other processing equipment in the desired sequence, the discharge of the finished mixture from the mixer after a definite and predetermined amount of processing, and particularly by means of specific tests automatically performed to prevent any mixture being made which does not contain the predetermined quantities of each of the several ingredients or which has not received the predetermined amount of processing, neither more nor less. The invention is particularly applicable to the formation of paving mixtures in the preparation of some of which considerable care must be exercised to obtain the desired results.

More specifically, the invention applies to an asphalt mixing plant which comprises a mechanical mixer in which the ingredients of an asphalt pavement are mixed together, weighing boxes in which the ingredients are weighed out preparatory to their being introduced into the mixer, hoppers from which the ingredients are intermittently fed to the weighing boxes as required, elevators or other means for raising the ingredients from the ground to the hoppers, and a source of power, and, if desired, when the asphalt is fed to the mixer in a pulverized or granulated state, a mechanical pulverizer. Such mixing plant constitutes the specific embodiment of the invention which is described herein. More detailed objects of the invention relate to the provision of means as indicated above in which proper control of ingredients is effected and which is of a flexible nature so that the timing of events occurring in the operation may be adjusted.

Further objects of the invention will become apparent from the following description read in conjunction with the accompanying drawings, in which:

Fig. 1 is a diagrammatic elevation showing the various parts of a typical mixing plant embodying the invention;

Fig. 2 is a diagrammatic view showing the controls associated with delivering means for a granular material such as sand or stone;

Fig. 8 is a diagrammatic view similar to Fig. 2 but showing the controlling means for a liquid ingredient;

Fig. 9 is a somewhat similar diagrammatic view showing the controls for emptying the ingredient mixer; and Fig. 10 is a diagram indicating the operations of the various parts in their relationships to each other.

Figure 7:
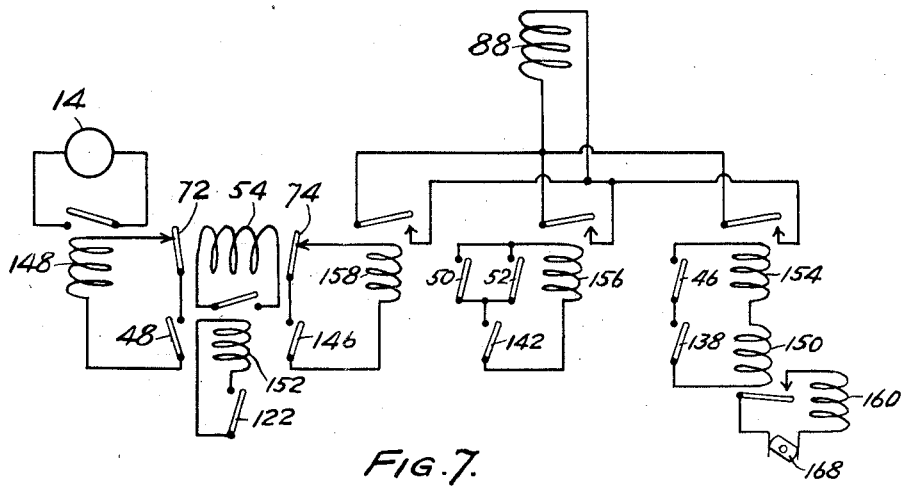
Fig. 7 is a conventionalized wiring diagram corresponding to that of Fig. 2 but simplified by the omission of power supplies, etc. so as to indicate more clearly the interaction of the various electrical elements.

The invention may be best understood by initial reference to a single ingredient unit together with its associated controls. The arrangement of such unit is illustrated in Fig. 2, to which reference will first be made.

The mixer for the various ingredients is indicated at 2, this mixer including stirring elements of conventional character, for example, involving blades mounted upon one or more shafts designed to either stir the mixture without imparting to it an advancing movement, or to both effect stirring and advance of the ingredients to better accomplish mixing. The mixer 2 is supplied with the ingredients from various sources, as will be brought out in greater detail hereafter. One of the direct sources of a solid ingredient to the mixer is the weighing box 4, whose outlet is controlled by means of a gate 6 pivoted about a horizontal axis 8 and normally urged towards closed position by the weight 10. The specific mechanisms whereby this gate is controlled will be described in detail later.

The weighing box is supplied with a solid ingredient by a belt 12 driven through suitable reduction gearing by a motor 14, the belt receiving the supply of ingredient from a hopper 16 located above it. The discharge end of this hopper is such in its relationship to the belt that when a certain amount of material is located on the stationary belt no further flow will occur. Accordingly, continuous delivery from the hopper 16 occurs only when the belt is moving. The construction of such a hopper is well known and need not be described in detail.

The weighing box 4 is supported upon a scale 18. An arm 20 connected to the scale platform is depressed by the load in the weighing box and tends to move downwardly a link 22 which is connected to a beam 24 pivoted at one end and in turn connected by a link 26 to a beam 28 fulcrumed on a support indicated at 30. The beam 28 carries a counterpoise 32 which may be moved along its length and held in adjusted position in conventional fashion. Downward movement of the right-hand end of the beam 28 is limited by a stop 34. Resting upon the right-hand end of the beam 28 is a roller carried by a depending projection 36 from an upper beam 38 which is also fulcrumed on the support indicated at 30 and carries a counterpoise indicated at 40. Upper and lower stops, respectively, indicated at 42 and 44, limit the movements of the beam 38 and are so placed that neither of them is engaged when the beam is in its horizontal balancing position. While one arrangement of weighing means has been disclosed, it is obvious that this may take various forms well known to the art.

The beam 28 is provided with a mercury switch indicated at 46 and so placed that when the beam 28 is above its horizontal position, the mercury within the switch will join the contacts therein to close a circuit. The beam 38 is provided with three mercury switches 48, 50 and 52. The first of these, 48, is so arranged that it will close its circuit when the beam 38 is in its horizontal balancing position or below such position, that is, up to and when a predetermined weight of contents exists in the weighing box 4. The switches 50 and 52 are so arranged that when the beam 38 is below its balancing position beyond a predetermined tolerance, the switch 50 will be closed, and when the beam is above its balancing position beyond a predetermined tolerance, the switch 50 will be opened and the switch 52 closed. In other words, one or the other of switches 50 and 52 will be closed whenever the beam is above or below the predetermined tolerance. The control by means of these switches will be brought out in greater detail hereafter.

Secured to the weighing box 4 is a gate operating solenoid 54 which is arranged to attract downwardly an armature 56 link-connected with a lever 58, which is pivoted concentrically with the gate 6. A spring 60 normally urges the lever 58 counterclockwise as viewed in Fig. 2 so as to withdraw the plunger 56 from the solenoid 54. The spring at the same time urges the lever against a stop 62 carried by the gate. When the plunger is attracted by the solenoid, the lever 58 is rocked clockwise into engagement with a stop 64 carried by the gate and after such engagement by its continued movement is adapted to open the gate positively if the contents of the weighing box do not initiate such opening. To prevent the contents from opening the gate, however, until the desired time, there is provided a latching arrangement involving the latching member 66 pivoted upon the gate. A spring 68 urges this latch in a clockwise direction to its limiting position in engagement with the stop 64. The left-hand end of the latch 66 is provided with a cam surface engageable by the lower end of the lever 58 to rock the latch in a counterclockwise direction to release it from engagement with the lug 70 secured to the weighing box. By reason of the arrangement just described, it will be seen that the contents of the weighing box are ineffective to open the gate until, by the attraction by the solenoid 54 of its armature 56, the lever 58 is rocked to cam the latch member 66 to a position where it disengages the lug 70. The gate is then positively opened by the further attraction of the plunger 56 through the engagement of lever 58 with the stop 64. This power actuation of the gate insures that it remains open until discharge is completed.

When the latch 66 is in its latching position, its end causes engagement of contacts 72 by reason of its pressing the upper spring-held one of the pair. When the plunger 56 of the solenoid 54 is in its lower attracted position, it engages the movable one of a pair of contacts 74, opening the circuit in which these contacts are interposed. The functions of both of the switches just mentioned will be brought out later.

A plurality of controlling devices for the various ingredients are driven from a common source indicated as a shaft 76, which desirably is slowly driven through suitable reduction gearing from the same source of power as the mixing elements in the mixer 2.

Figure 3:
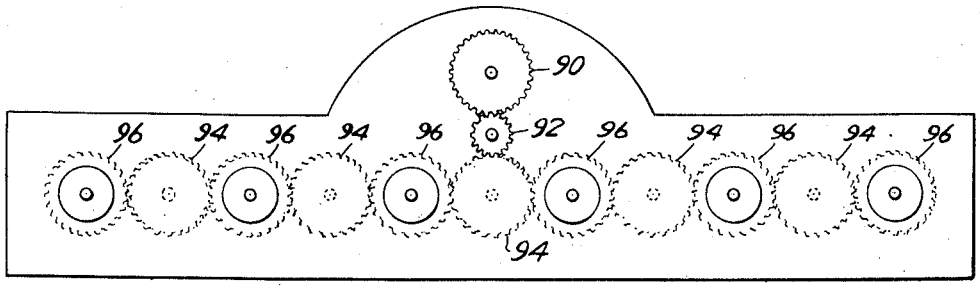
Fig. 3 is an elevation illustrating the association of various control devices for different ingredients.

The shaft 76 carries the fixed element 78 of a clutch, the movable element 80 of which is splined to a shaft 81 and is urged into engagement with the member 78 by a spring 82. A forked lever 84 is connected at one end to a collar carried by the clutch element 80 and at its other end to a plunger 86 adapted to be attracted by a solenoid 88 so as to cause a disengagement of the clutch elements and consequent stoppage of the various controlling mechanisms. The shaft 81 carries a gear 90 which, through an intermediate idler arrangement illustrated at 92, drives another idler 94, which forms one of a set of intermediate idlers meshing with gears 96 as indicated in Fig. 3.

As will be obvious hereinafter, the length of time of a cycle of operation may be adjusted by changing the relative sizes of the gears 90 and 92. Each of the gears 96 except one directly drives the controlling mechanism for the devices handling a single ingredient. The excepted one drives a similar controlling mechanism of the type indicated in Fig. 9 for determining the time of discharge of the mixed ingredients from the mixer. In the present instance, there are six controlling mechanisms to take care of the five ingredients and the mixer.

One of the controlling mechanisms is specifically illustrated as driven by the gear 96 shown in Fig. 2. The gear 96 is mounted upon a shaft 98 to which is secured a flanged head indicated at 100 carrying suitable markings which may indicate degrees or any other suitable circumferential intervals. Rotatably mounted upon the shaft 98 is a sleeve 102 which, at its righthand end, carries a flange 104 arranged to flatwise engage the flange 100 and provided with an indicating marking, for example, in the nature of a line inscribed on its periphery which may be brought into proper relationship with respect to the markings on 100. Journalled upon the sleeve 102 is a second sleeve 106 which similarly carries a flange 108 also provided with a marking, which may be lined up with the markings on 100. Adjustment of the controlling mechanism is effected by the relative rotation of the sleeves 102 and 106 with respect to the shaft 98 and their fixation in such adjusted position by means of a clamp 110, which serves to tightly hold the flanges together when the screw member 112 is tightened. As will be evident hereafter, each of the other controlling mechanism is similarly arranged and for proper operation all of them are relatively adjusted to secure a proper timing of events.

Figure 6:
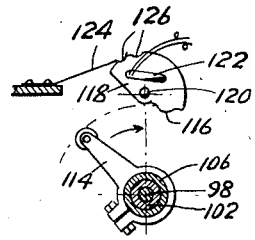

The sleeve 106 carries an arm 114 which supports an outer roller adapted to engage a cam 116 carried by the carrier 118, which is secured to a shaft 120 mounted to turn freely in the supporting frame for the controlling mechanism. The carrier 118 supports a mercury switch 122. Depressions 126 in the edge of the carrier may selectively receive the end of a spring detent 124 so as to yieldably hold the carrier either in the clockwise position illustrated in Fig. 6, in which the switch is open, or in an alternative counterclockwise position, in which the switch is closed.

Mounted loosely upon the shaft 120 there is an element 128 which is connected by means of a spiral spring 134 with a collar 135 secured to the shaft 120. The element 128 is provided with a cam portion 130 engageable by an actuating roller carried by an arm 132 secured to a sleeve 102.

The arms 114 and 132 are so related as to successively effect a rocking of the carrier 118 to close and then open the mercury switch 122. The arm 114 engages the cam 116, rocking it counterclockwise as viewed in Fig. 6 to cause the right hand depression 126 to pass beneath the detent 124. The switch is then closed. Thereafter the arm 132 engages the element 128, rocking it clockwise and thereby tensioning the spring 134 to cause it to rock the shaft 120 clockwise and thereby move the switch 122 to its open position. The spring connection is provided to prevent breakage in case the arms 114 and 132 should be accidentally set so as to act simultaneously upon the cams 116 and 130. This, of course, should not occur in operation but the actions should be successive as just indicated and as will be described in greater detail later.

Figures 4, 5:
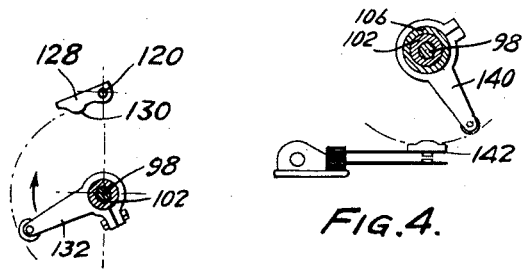
Figs. 4, 5 and 6 are sections through controlling mechanism taken as indicated at 4—4, 5—5, and 6—6, respectively, in Fig. 2.

Contacts 138, 142 and 146 are provided arranged to be closed by engagement with arms 136, 140 and 144, respectively. The first of these arms is carried by the sleeve 102 while the latter two are carried by the sleeve 106. All of the arms already described may be adjusted upon the sleeves so as to set them in properly timed relationships to each other. The arrangement of the arm 140 with respect to the contacts 142 is illustrated specifically in Fig. 4. The other arms and contacts are of similar construction.

In addition to the controlling elements already described, each ingredient unit has some or all of certain other elements. Among these is the starting relay 148 for the motor 14. Additional relays 150, 152, 154, 156, and 158 are provided for effecting various operations. The relay 150 is arranged to close the circuit through a solenoid 160, which attracts the plunger 162 against the tension of a spring 166. The circuit to the solenoid 160 is periodically interrupted by a commutator 168 so that the plunger 162 is successively attracted and released to cause its head 164 to hammer the bottom of the weighing box 4 to insure liberation of any materials which may tend to stick therein. The source of power for the operation of the majority of the elements in Fig. 2 is indicated conventionally at 170, while batteries are indicated in local relay circuits. The batteries have been illustrated to avoid complication, it being understood, of course, that in the practical arrangement of the device only a single source of power would be employed for actuating all of the electrical devices. In Fig. 7, there has been conventionalized the wiring diagram to illustrate in a better fashion the control of the various electrical elements by others. In this diagram, all types of switches, including mercury switches, are conventionalized as knife switches, which in certain instances are the armatures of relays. Both power solenoids and relay coils are illustrated as simple coils. Sources of power have been omitted, it being understood that each of the circuits would be provided with suitable power from a common source or a plurality of sources.

From Fig. 7 a general understanding of the interlocking of the elements may be had. It will be noted that the solenoid 88 serving for the disengagement of the main driving clutch of the control mechanisms is controlled by three separate relays 154, 156, and 158 of each of the units containing all three or of one relay at least of a unit which does not contain all three. Energization of each of these relays of the various units represents an abnormal condition and will result in a disengagement of the clutch member 80 and stopping of all of the control mechanisms.

The relay 154 is in series with the mercury switch 46 and the contacts 138 and is also in series with the relay 150 which serves to close the circuit through the solenoid 160, which circuit also contains the interrupter 168. In practice, of course, the relays 150 and 154 may be incorporated into a single unit.

The relay 156 is in series with the contacts 142 and also with the parallel arrangement of the mercury switches 50 and 52.

The relay 158 is in series with the contacts 146 and the contacts 74 which are controlled by the energization of the solenoid 54 if such energization is effective to attract the plunger 56. The solenoid 54 is controlled by the relay 152, which is in turn controlled by the mercury switch 122. Additionally, the solenoid 54 is effective to open the contacts 72 through the liberation of the latch 66, which contacts 72, together with the mercury switch 48, are in series with the relay 148 which controls the circuit of the motor 14.

The above description of Fig. 7 outlines briefly the relationships of the various electrical elements. The control of a solid ingredient in Fig. 2 has been first specifically described, since it involves all of the elements necessary for proper control of any ingredient, including, for example, the means for hammering upon the weighing box to insure discharge. It also includes all of the elements which are essential for controlling the discharge from the mixer. Consequently, a consideration of Figs. 2 and 7 will include the most elaborate type of operation of any of the units. Before proceeding to a discussion of the handling of liquid ingredients or the discharge from the mixer, the sequence of operations occurring in the action of the unit of Fig. 2 will be described with reference to Fig. 10. This figure, taken together with Figs. 2 and 7, will illustrate the detailed operations involved.

Fig. 10 is merely diagrammatic and while the abscissae represent time intervals, there has been no attempt made to indicate the relative lengths of these intervals, but only their sequence, and to that extent the figure is very substantially distorted, since relatively long intervals may occur in the introduction of the materials into the weighing boxes or tanks, the discharge therefrom, and the mixing as compared with the intervals in which tests of proper operations are made. Furthermore, the two periods designated as indicating the delivery of preceding and subsequent ingredients would be very large if the ingredients are to be added successively rather than simultaneously.

Various characteristic elements are indicated at the left of Fig. 10. In general, the rise of a line corresponding to one of these elements indicates the energization of a solenoid, relay, or motor, or closure of switches or contacts. The lowermost of the graphs illustrates by its rise the increase of contents of the weighing box.

As soon as the gate 6 is closed following a previous delivery of contents from the weighing box, the contacts 72 will be closed as well as the mercury switch 48 so that the motor 14 will be energized and delivery of material by the conveyor 12 to the weighing box 4 started. The graphs in Fig. 10 begin with this event. When the weighing box 4 is empty, the beam 38 will rest upon its lower stop 44 while the beam 28 will be in its horizontally balanced position floating above its stop 34, but not in contact with projection 36, in such position that the switch 46 will be open. This condition corresponding to the tare weight of the weighing box 4 is secured by adjustment of the counterpoise 32. The counterpoise 40 will be located in position corresponding to the desired weight of material to be discharged into the mixer for a batch. This adjustment will be such that when the weighing box contains the predetermined quantity of material, the beam 38 will occupy a horizontal balanced position.

As soon as a very small quantity of material has been introduced into the weighing box, the beam 28 will rise until it engages the roller carried by the downward projection 36. It will, of course, not raise the beam 38 but the motion at this time is sufficient to close the switch 46. No immediate action, however, is effected by such closure, since the contacts 138 remain open.

As the material enters the weighing box 4, the force exerted tending to raise the right-hand end of the beam 38 increases. As soon as the minimum permissible weight is exceeded, the beam 38 will rock upwardly to an extent causing an opening of the switches 48 and 50.

These switches 48 and 50 may be combined into one controlling a circuit containing relays which in turn would control separate circuits. They are shown separate in the present disclosure for simplicity. Under some conditions, as for example where the flow of material does not cease for a quite appreciable time after the opening of switch 48, it may be desirable to have the switch 48 open before switch 50 to avoid an excess flow of material such as might exceed the upper limit of weight controlled by switch 52. The switch 48 is in series with the relay 148 which controls the operation of the motor 14. Consequently, if the operation has occurred correctly, the feed of material by the belt 12 will cease and the weight of material within the box 4 will be between the limits of tolerance. Under proper conditions, the beam will not have risen sufficiently to cause a closure of the switch 52. Following this event, a test is made to determine whether the weight is within the limits of tolerance due to proper operation. The arm 140 closes the contacts 142 as indicated in the diagram of Fig. 10. An abnormal condition of either the switch 50 or the switch 52 is indicated in Fig. 10 in dotted lines. If, when the switch 142 is closed, both the switches 50 and 52 are open, the relay 156 will not operate and the solenoid 88 remains deenergized and consequently the clutch member 80 remains in driving engagement with the clutch member 78. If, however, either switch 50 or 52 is closed due to a deviation from proper weight exceeding the tolerances, then the relay 156 will be energized, energizing the solenoid 88 and disengaging the clutch, stopping the machine. Preferably, the reason for the stoppage is indicated by audible or visual means, for example, the use of lamps, which are indicated in various circuits in Fig. 2.

If stopping of the apparatus occurs at this time, the cause may be traced and the condition rectified by either a further manual addition of material to the weighing box or removal of material therefrom. After rectification of the condition, switches 50 and 52 will both be opened and operation will proceed. Immediately after operation continues, the contact at 142 is broken.

The next event consists of the closure of mercury switch 122 by the action of the arm 114. The closure of this switch energizes the relay 152 which in turn energizes the solenoid 54. If conditions are proper, the plunger 56 will be attracted, opening the gate and opening the contacts at 72 and 74, initiating a discharge of the material.

At this point, however, there is a possibility of failure of operation; for example, the gate may be jammed so as not to open under the pull of the solenoid 54. In this event, the switch 74 will not open. This last switch will be opened only when the solenoid is moved to a sufficient extent to open the gate 6.

If the gate is opened, the discharge of the material should begin and the beam 38 should immediately drop, closing both switches 48 and 50. If the gate is sufficiently opened, there is, of course, no question of the fact that sufficient material will leave the weighing box to cause such dropping of the beam, so no test need be made to determine whether or not the beam is dropped. However, a test is made to determine whether switch 74 has been opened. This test is made by the closure of the contact 146. If the switch 74 is not opened, the relay 158 will be energized, causing energization of the solenoid 88 and a disengagement of the clutch, stopping the mechanism. The abnormal conditions will be evident from the dotted lines in Fig. 10, the normal conditions in this figure being represented by full lines.

After any abnormal condition occurring at this time is rectified, the material should flow from the weighing box so as to empty it to such extent that the switch 46 will be opened. If, however, an amount of residual material remains in the weighing box exceeding a predetermined tolerance, the switch 46 will not be opened. The abnormal conditions then arising are made the subject of a test which depends upon the closure of the contacts 138. From Fig. 7, it will be seen that if 46 is closed, then when 138 closes the relay 154 will be energized, causing the solenoid 88 to disengage the clutch. At the same time, the relay 150 is energized, causing the periodic energization of the solenoid 160 to operate the hammer to tap the weighing box. If the material is dislodged by the action of the hammer, the abnormal condition is automatically cured, since, as soon as the material leaves the weighing box, the switch 46 will be opened and operation resumed. If, however, the action of the hammer is insufficient to remove the residual material, then manual correction of the condition must be made.

Following the removal of the material from the weighing box, the switch 122 is rocked to its opened position; the relay 152 and solenoid 54 are then deenergized. The release of the gate thus effected should result in its being moved to closed position under the action of the weight 10, so as to cause a closure of the contacts 74 and 72. If, however, the latch 66 does not properly engage the lug 70 so as to lock the gate in closed position due either to a failure of the gate to completely close or to a failure of the latch to drop over the lug, then the contacts 72 will remain disengaged, preventing the closure of the circuit of the relay 148 and consequently preventing operation of the motor 14. The abnormal condition thus resulting may be either noted immediately or, as specifically illustrated, it will come to the attention of an attendant, inasmuch as when a weight test is made in the next cycle, it will be found that the weight of the weighing box is deficient, since, of course, it will be empty. The operation would then be automatically stopped until the gate was completely closed.

It has been pointed out above that Fig. 10 is not intended to represent the relative times during which the operations take place. During the above described operation of a cycle for a single solid ingredient, other solid and liquid ingredients will have been added. In the cycles involving other additions, any abnormal conditions will likewise energize the solenoid 88, stopping the operation of the mechanism. The various events involved in the delivery of any one ingredient are necessarily timed by a proper setting of the sleeves 102 and 106 relative to the shaft 98 corresponding to that ingredient. If successive delivery of ingredients to the mixer is desired, then relative adjustments of the sleeves on any one shaft must be made with respect to the sleeves on all of the other shafts. Of course, the time of discharge of the mixer must be so adjusted. It will be obvious, however, that the various operations can overlap to such extent as will produce a satisfactory operation. The use of a single controlling solenoid 88 insures that the events cannot happen out of a proper order, since the controlling mechanism of all of the units will be definitely stopped.

While certain conditions were heretofore described as abnormal, the stoppage of the controlling mechanism may very well occur in normal operation. If, for example, the delivery of an ingredient to a weighing box is relatively slow, then the test to determine whether a full weight has been reached may occur before that full weight is normally reached. The controlling mechanism, however, will then be restarted as soon as the full weight is reached. While the various tests have been considerably stressed, it must not be assumed that the abnormal conditions which they represent will ordinarily occur. The tests merely represent checks which are made for the sake of absolutely insuring the production of proper mixtures.

Having described fully the operation involved in the addition of a single ingredient, the operations in connection with the addition of a liquid ingredient and the emptying of the mixer will be readily understood. Since both of these involve quite substantial duplication of controlling elements, the description will not be repeated in detail but there will be referred to only the elements which differ from those already described and do not correspond to those already described.

Considering first Fig. 8, which illustrates the apparatus associated with the delivery of a liquid ingredient, such as an oil or the like, a supply tank 172 is provided which is arranged to deliver the ingredient through a conduit 174 which is controlled by a valve 176 adapted to be actuated by a solenoid 178. The valve 176 corresponds to the conveyor 12 and its operating solenoid 178 corresponds to the motor 14. The solenoid 178 is controlled by the relay 190 which corresponds to the relay 148.

Discharge from the weighing tank is effected through a conduit 182 which is controlled by a valve 184 arranged to be opened by the energization of a solenoid 186. The plunger of the solenoid is adapted to open the contacts 192. As soon as opening of the valve begins, the contacts 188 are disconnected. The solenoid 186 is energized through a relay 193 which is in turn energized by a mercury switch corresponding to 122. The counterparts of the elements just mentioned will be readily apparent upon reference to Fig. 2, from which it will be seen that 184 corresponds to gate 6, 186 corresponds to 54, 192 to 74 and 188 to 72. These various elements correspond identically in their functions, the various switches insuring stopping of the operation in case the valve 184 is not opened or closed at the proper times.

Relays 194, 196 and 198 correspond to 154, 156 and 158, respectively. The elements of the controlling mechanism need not be fully described, since their functions are identical with those used in the other mechanism. The solenoid 88 is, of course, the same one as that shown in Fig. 2.

The control of the delivery of the mixer involves a considerable simplification of the controlling elements as compared with those involved in the handling of ingredients inasmuch as no weighing or measuring is involved. The simplification, however, consists primarily in the omission of various elements and will, therefore, be clear from a brief consideration of Fig. 9 in conjunction with what has already been described.

The outlet of the mixer 2 is controlled by a sliding gate 200 which is connected with a piston 204 sliding in a cylinder 206 into the ends of which compressed air or other fluid may be introduced through the passages 208 connected to the controlling valve 210 which, by rocking in opposite directions, alternately connects the conduits 208 to the supply of working fluid through 212 or with the atmosphere or discharge tank through 214. The valve 210 is controlled by a solenoid 216 acting in opposition to a spring 218. The solenoid 216 corresponds to the solenoid 54 and is controlled by a relay 220 corresponding to 152, the relay 220 being energized by a mercury switch corresponding to 122. The piston rod 202 connected to the gate 200 carries a collar 203, which is arranged to hold contacts 226 open when the gate 200 is closed and which is arranged to disengage contacts 222 when the gate is fully opened. The contacts 226 are in the circuit of a relay 228 which is in turn in circuit with the contacts 229 which may be engaged by an arm 231. If, at the time contacts 229 are engaged, the contacts 226 are also engaged by reason of the fact that the gate is not fully closed, then the relay 228 will be energized to stop the operation. The test by the action of arm 231 on contacts 229 would, of course, occur after the gate was supposedly closed and before any ingredients were delivered to the mixer.

The contacts 222 are disconnected only when the gate is fully opened; consequently, if the arm 225 closes the contacts 227 before the gate is fully opened, the relay 224 will be energized, stopping the operation by energizing the solenoid 88.

It will be clear from the above that the automatic mixing of various ingredients may be accomplished with complete assurance that the proper proportions are introduced into the mixer.

The diagrammatic illustration of the assembly of the parts is indicated in Fig. 1. The hopper 16 is indicated therein as supplied with solid ingredients by means of an elevator 260. A similar hopper 254 located adjacent to it is supplied from another elevator indicated at 262, and delivers its solid ingredient upon a belt 256 similar to belt 12, which in turn delivers into a weighing box 258. Another solid ingredient is supplied from a hopper 248 by means of a belt 250 and is introduced into a weighing box 252. The ingredient handled by 248 may possibly be a comparatively fine dust and arrangements are therefore made to prevent loss by suitable housing. A crusher or pulverizer 236 may be provided driven through a belt 234 by a source of power such as an electric motor, a steam engine, or preferably an internal combustion engine 230. The material crushed or pulverized by this apparatus is delivered through a pipe 238 to a container 240 in which it is separated from carrying air and is then fed by a belt 242 to a weighing box 244. The internal combustion engine may be arranged to drive the mixer through suitable reduction gearing indicated at 246. The belts which are shown are merely conventionalized conveyors since others may be used, either motor driven, or driven by the engine through electrically controlled clutches. Alternatively gravity feed may be employed, control being by the the use of gates or valves.

The liquid-containing tank 172 may be jacketed if it contains, for example, a viscous bituminous material, or in case a steam or internal combustion engine is used as the source of power, the jacket may be so arranged as to be heated by the exhaust from the engine led to it through a passage 232. The delivery conduit 174, which has already been described and which may also be jacketed to insure free flow, is arranged to lead the fluid contents to the weighing tank 180 which is located above the mixer 2. The mixer itself may be arranged to discharge, for example, directly into a suitable truck when the apparatus is used for the preparation of paving mixtures. This truck may then be taken directly to the location where paving is being done.

The gate of the mixer has been described as operated by a fluid. This is desirable if the fluid used is made available for some other purposes. If not, the gate may be otherwise controlled. It will be obvious that the details of operation may be subject to considerable variation. In general, it may be desirable to provide for the cutting out of the automatic controls for various ingredients so that these ingredients may be added under manual control. Likewise, provision may be made for totally cutting out of the operation those elements associated with one or more ingredients. This may be accomplished by not only stopping the feed of that ingredient, but making inoperative its associated mechanism for controlling the clutch 80. It may also be desirable to add, in the formation of a single batch, some particular ingredient at spaced intervals. This may, of course, be effected merely by a duplication of the control elements for that ingredients so that its particular cycle will occur two or more times in a complete cycle of operation.

The relative timing may, of course, be effected merely by the proper adjustments of the arms and sleeves forming parts of the controlling mechanisms. The total time taken for a complete cycle may be changed merely by varying the speed of rotation of the shafts 98 by gear changes as described above. For example, this may be desirable if especially prolonged mixing is desired. It will be noted that in the modification described, as soon as one ingredient is delivered to the mixer a new batch of that ingredient is weighed so as to be ready for delivery at the proper subsequent time. Suitable provision may be made to stop the mechanism at the end of a complete cycle, although in general, particularly when paving mixtures are being prepared, the cycles may be automatically repeated.

It may be pointed out that the automatic control mechanism functions entirely independently of the manner in which the ingredients are fed to the weighing boxes. The weighing boxes could be filled by hand without altering the tests as to accuracy of weight, and without any effect whatever upon the control principle. In other words, the tests are effective irrespective of whether or not there is automatic delivery and weighing.

While the apparatus has been rather broadly described, its particular advantages in connection with the preparation of paving mixtures may now be pointed out. There are known, for example, paving mixtures which are formed without the use of heat, the paving being produced from cold mixtures. Such mixtures may include as ingredients crushed stone, emulsified flux, sand, filler dust and hard asphalt. The emulsified flux referred to may comprise a bituminous material cut back by an oil and suitably dispersed in order to form an emulsion. This emulsion may be mixed with the crushed stone, sand and filler dust and with a pulverized hard asphalt. By the breaking of the emulsion the asphalt particles are fluxed and caused to coalesce and provide a mixture which, after being laid and pressed down, will form a suitable paving. The emulsified flux may be, in some instances, replaced by a flux comprising bituminous material liquefied by the addition of oil.

In the preparation of a mix such as indicated above, the ingredients must be used in their proper proportions and in proper sequence. The plant indicated in Fig. 1 is very well adapted for this purpose and is representative of the arrangement of elements for the preparation of paving mixes. The various ingredients are added to the mixer from the supplies indicated in that figure. The hoppers 16, 254 and 248 may contain, respectively, stone, sand, and the filler dust. An emulsified flux may be supplied from the tank 172 which, in such case, need not be heated. If, on the other hand, the flux consists only of bituminous material of suitable consistency, then the jacket may be used to maintain it in a proper liquid condition. The asphalt is supplied in lumps to the pulverizer 236, where it is finely crushed and delivered by a blower through the conduit 238 into the receptacle 240. It is found that the harder grades of asphalt at least may be pulverized and then retained for substantial periods without coalescing. The rearrangement of the apparatus to effect this will be obvious; such rearrangement does not substantially change the controls.

The various additions of materials may be either successive or simultaneous, followed by a prolonged mixing period, or may overlap to any extent that may be desired. The total cycle length is, of course, very much reduced by the fact that the filling of the weighing boxes or weighing tank may occur during the additions of other ingredients or the mixing. It will, of course, be obvious that more or less ingredients may be added depending upon the character of the character of the product desired. If it is necessary to keep the product hot, then the mixer may be jacketed and heated by steam or exhaust gases, or other means known to the art.

Although for descriptive purposes the plant has been described above with reference to particular types of mixes, it may be pointed out that it is actually designed to be used for practically all known types of bituminous mixtures whether they involve hot or cold aggregates, hot asphalt, emulsified asphalt, pulverized asphalt, hot or cold flux, or emulsified flux, the change required in any case being only those which would be obvious to one skilled in the art from reading the present specification.

In fact, the plant is of even greater utility in the preparation of hot mixes than in the preparation of cold mixes since accurate proportioning of the type obtainable in accordance with this invention is of particular importance in the case of the former. The discussion of use in cold mixes is therefore to be understood as in no way restrictive of the scope of the invention. For example, the apparatus is applicable to the preparation of a paving mix in which the stone may be coated with a soft bitumen and subsequently mixed with dust and a hard bitumen. It will be obvious that such mixes require only obvious modifications of the apparatus for their production. It may also be pointed out that it is broadly applicable to many other chemical or physical processes.

It will be clear that numerous changes may be made in the specific embodiment of the invention without departing from its scope as defined in the following claims.

What I claim and desire to protect by Letters Patent is:

1. In combination, means arranged to effect, in a normally sequential series of operations, accumulation and measurement of a predetermined quantity of material; auxiliary means for testing for the occurrence of a normal condition in the series of operations automatically effective irrespective of the occurrence of said normal condition and only following a substantial interval of time after such condition should have occurred; and means rendered operative by said testing means at the termination of said interval of time to interrupt said series of operations automatically in the event that such normal condition has not occurred.

2. In combination, means arranged to effect, in a normally sequential series of operations, accumulation and measurement of a predetermined quantity of material, said means including a container, a closure therefor, means for delivering material to the container, and means for indicating the amount of material in the container; auxiliary means for testing for the occurrence of normal conditions in the series of operations, said normal conditions including an empty condition of the container prior to delivery of material thereto, and a final predetermined quantity of material therein, said auxiliary means being effective irrespective of the occurrence of any of said normal conditions and only following a substantial interval of time after each condition for which a test is made should have occurred; and means rendered operative by said testing means at the termination of such interval of time to interrupt said series of operations automatically in the event that such normal condition has not occurred.

3. In combination, means arranged to effect, in a normally sequential series of operations, accumulation, measurement and delivery of a predetermined quantity of material, said means including a container, a closure therefor, means for delivering material to the container, and means for indicating the amount of material in the container; auxiliary means for testing for the occurrence of normal conditions in the series of operations, said normal conditions including an empty condition of the container prior to delivery of material thereto, a final predetermined quantity of material therein, and opening of said closure to discharge said material, said auxiliary means being effective irrespective of the occurrence of any of said normal conditions and only following a substantial interval of time after each condition for which a test is made should have occurred; and means rendered operative by said testing means at the termination of such interval of time to interrupt said series of operations automatically in the event that such normal condition has not occurred.

4. In combination, measuring means; means controlling discharge of the material from the measuring means; means for effecting a test to determine whether the quantity of material in the measuring means lies between given upper and lower limits and effective only following a substantial interval of time after the quantity of material in the measuring means should lie between said limits; and means controlled by said testing means to initiate and effect discharge from the measuring means only in the event that the quantity of material in the measuring means lies between said limits.

5. In combination, measuring means; means controlling delivery of material to the measuring means; means controlling discharge of the material from the measuring means; means for automatically interrupting said controlled delivery of material to the measuring means; means for effecting a test to determine whether the quantity of material in the measuring means lies between given upper and lower limits and effective only following a substantial interval of time after interruption of delivery of material to the measuring means; and means controlled by said testing means to initiate and effect discharge from the measuring means only in the event that the quantity of material in the measuring means lies between said limits.

6. In combination, measuring means; means controlling delivery of material to the measuring means; means controlling discharge of the material from the measuring means; means for automatically interrupting said controlled delivery of material to the measuring means; and means automatically operative only in the event that the quantity of material in the measuring means lies between predetermined limits after a substantial interval of time following interruption of the delivery of material, to initiate and effect discharge of the material from the measuring means.

7. Means for effecting the delivery of a plurality of ingredients in predetermined amounts to a common receptacle including a plurality of measuring means; means for effecting automatic delivery of materials to the measuring means; and means automatically operative only in the event that the quantity of material in each measuring means lies between predetermined limits after a substantial interval of time following interruption of delivery of material thereto, to initiate and effect its discharge and subsequent discharges from the various measuring means in predetermined timed relationships.

8. Means for effecting the delivery of a plurality of ingredients in predetermined amounts to a common receptacle including a plurality of measuring means; means for effecting automatic delivery of materials to the measuring means; and means for initiating and effecting successive discharges from the various measuring means in predetermined timed relationships, said means being automatically operative to effect discharge of any measuring means only in the event that the quantity of material in that particular measuring means lies between predetermined limits after a substantial interval of time following interruption of delivery of material thereto.

9. In combination, timing means normally continuously operating; measuring means; means controlled by said timing means for effecting automatic periodic delivery of material to the measuring means in normally successive cycles of operation; means controlled by said timing means for effecting discharge of the material from the measuring means at predetermined intervals; and means controlled by the measuring means for stopping the operation of the timing means if any discharge is not properly effected.

10. Means for effecting the delivery of a plurality of ingredients in predetermined amounts to a common receptacle including a plurality of measuring means; timing means normally continuously operating; means for effecting automatic delivery of materials to the measuring means, means controlled by the timing means for effecting successive discharges of the materials from said various measuring means into the receptacle in predetermined time relationships, and means for stopping the operation of the timing means if, by the time discharge from any of said measuring means is to be effected the quantity of material therein does not lie between predetermined upper and lower limits.

11. In combination, weight measuring means comprising a receptacle; means for supplying material to the receptacle; means for automatically testing the tare weight of the receptacle prior to operation of the supplying means; and means automatically preventing operation of the supplying means if the tare weight is abnormal and for automatically timing the initiation of operation of the supplying means if the tare weight is normal.

12. In combination, means arranged to effect, in a series of operations, measurement of a predetermined quantity of material and discharge of such quantity; controlling means for the operations; actuating means for normally continuously driving the controlling means; and means operative to automatically interrupt the operation of the actuating means upon the occurrence of an abnormal condition in the series of operations and to continue the operation of the actuating means when such abnormal condition is corrected.

13. In combination, means arranged to effect, in a normally sequential series of operations, accumulation and measurement of a predetermined quantity of material; controlling means for the operations; actuating means for normally continuously driving the controlling means; means for testing for the occurrence of a normal condition in the series of operations only following a substantial interval of time after such condition should have occurred; and means rendered operative by said testing means at the termination of said interval of time to interrupt the operation of the actuating means in the event that such normal condition has not occurred.

14. In combination, means arranged to effect, in a normally sequential series of operations, accumulation and measurement of a predetermined quantity of material; controlling means for the operations; actuating means for normally continuously driving the controlling means; and means operative to automatically interrupt the operation of the actuating means upon the occurrence of an abnormal condition in the series of operations and to continue the operation of the actuating means when such abnormal condition is corrected.

15. In combination, measuring means arranged for the accumulation of a predetermined quantity of material; means for interrupting further introduction of material into the measuring means after the measuring means contains substantially said predetermined amount of material; means for effecting discharge of material from the measuring means; and means for preventing discharge of material from the measuring means for a substantial period following the action of said interrupting means, and thereafter for preventing normal discharge of material from the measuring means if the quantity of material in the measuring means does not lie within predetermined upper and lower limits.

16. In combination, measuring means; means controlling delivery of material to the measuring means; means automatically operative after a predetermined quantity of material is in the measuring means for interrupting delivery of material to the measuring means; and means for normally periodically effecting discharge from the measuring means at predetermined approximately equal time intervals after and if the measuring means contains a quantity of material lying within predetermined upper and lower limits; said last named means being timed to effect discharge independently of the time of the filling operation.

17. In combination, measuring means; means controlling delivery of material to the measuring means; means automatically operative for interrupting delivery of material to the measuring means after a quantity of material exceeding a predetermined minimum is therein; means including a timing means for automatically effecting discharge of material from the measuring means only after a substantial interval following the interruption of delivery of material to the measuring means; and means for automatically preventing the operation of said means for automatically effecting discharge if the quantity of material in the measuring means is outside predetermined limits.

EDMUND A. PRATT.